United States Patent [19]
Hackman et al.

[11] Patent Number: 5,791,367
[45] Date of Patent: Aug. 11, 1998

[54] PRESSURE RELIEF DEVICE

[75] Inventors: Donald J. Hackman, Upper Arlington, Ohio; William D. Ingle, Park Ridge, Ill.

[73] Assignee: Gas Research Institute, Chicago, Ill.

[21] Appl. No.: 591,829

[22] Filed: Jan. 25, 1996

[51] Int. Cl.$^6$ ............................................. F16K 17/38
[52] U.S. Cl. ................................ 137/74; 220/89.4
[58] Field of Search ................ 137/72, 74; 220/89.4

[56] References Cited

U.S. PATENT DOCUMENTS

| | | | |
|---|---|---|---|
| 47,076 | 3/1865 | Smith | 137/74 X |
| 195,367 | 9/1877 | Hiller | 137/74 |
| 243,847 | 7/1881 | Burritt | 137/74 |
| 900,763 | 10/1908 | McNutt | 137/74 X |
| 3,927,791 | 12/1975 | Hershberger | 220/89.4 |
| 4,744,382 | 5/1988 | Visnic et al. | 137/74 X |
| 5,111,837 | 5/1992 | Morris et al. | 137/74 X |
| 5,398,794 | 3/1995 | Walberg et al. | 137/74 X |

*Primary Examiner*—John Rivell
*Attorney, Agent, or Firm*—Speckman Pauley Petersen & Fejer

[57] ABSTRACT

A pressure relief device that is normally closed and that moves into an open condition under certain design parameters which require fluid to flow from a relatively high-pressure chamber within a vessel to a relatively low-pressure atmosphere surrounding the pressure relief device. A plug housing has a throughbore which forms communication between the chamber within the vessel and the outside atmosphere. A plug is positioned within the throughbore. A fusible alloy at least partially fills a void or a passageway which is preferably formed between the plug and the plug housing. In an upset condition, such as an external fire, the temperature of the fusible alloy rises and thereby softens or melts the fusible alloy. As the fusible alloy softens, the bonding and shear strengths of the fusible alloy are reduced. The relatively high-pressure fluid acting upon the plug preferably forces or blows at least a portion of the plug out of the throughbore. As the plug blows out of the throughbore it opens a relatively large unrestricted opening through which fluid within the vessel can be vented at a relatively high flowrate.

10 Claims, 5 Drawing Sheets

PRESSURE RELIEF DEVICE

BACKGROUND OF THE INVENTION

1. Field of the Invention

This invention relates to a pressure relief device that has a plug which under certain conditions blows out of a plug housing at a relatively fast response time to temperature change, to expose a relatively large unrestricted throughbore within the plug housing through which high-pressurized fluid can pass at a relatively high flowrate.

2. Description of Prior Art

Conventional thermal pressure relief devices, for example those which are used with compressed natural gas systems, employ fusible alloys which melt when exposed to certain temperatures. As the fusible alloy melts, it often triggers a spring-loaded or pressure-loaded valve. Such conventional pressure relief devices are expensive and over time become more unreliable and prone to failure because such conventional pressure relief devices contain elastomeric seals and many moving mechanical parts, some of which require precision machining. Such conventional pressure relief devices also contain heavily bias-loaded springs that create a maintenance safety hazard.

Conventional pressure relief devices use fusible alloys which are formed within a bore of a housing, or within passageways formed within the housing. As the fusible alloy melts, the relatively high-pressure fluid slowly forces the fusible alloy through the passageways and then through relatively small cross-sectional area discharge ports within a plug housing. Conventional pressure relief devices are designed so that in an open condition the plug does not discharge from or blow out of the plug housing. In other conventional pressure relief devices a fusible alloy is cast or poured within an entire cross section of the bore. In conventional pressure relief devices that have a relatively large bore, initial gas release through a relatively small passageway within a portion of weakened fusible alloy cools the surrounding fusible alloy and prevents immediate meltdown of the entire mass of fusible alloy, thereby restricting the size of the fluid passageway and increasing the response time for the gas to discharge during an upset condition.

In many applications related to the natural gas vehicle industry, indirect mechanically actuated pressure relief devices are necessary because of the relatively high flow requirements, the rapid response time required when using composite overwrapped cylinders, and the creep characteristics of fusible alloys. Mechanically actuated pressure relief devices have more potential for mechanical failure than do fused plug devices. Pressure relief devices are typically used to vent pressure vessels or cylinders that are constructed of all metal, a metal liner which is reinforced with hoop-wrapped fiber composite, metal liners that are reinforced with full-over wrap fiber composite, and composite containers with non-metallic liners.

Many conventional pressure relief devices are prone to mechanical failure due to creep characteristics of fusible alloys, cyclic pressure fatigue, corrosion, stress corrosion cracking, elastomer property degradation due to cold temperatures and corrosive environments, body and component distortion, and foreign matter jamming components of the valve mechanism. There is an apparent need for a reliable pressure relief device that contains few mechanical parts and that opens quickly to allow a relatively high flowrate of high-pressure fluid to be vented from a pressurized vessel.

SUMMARY OF THE INVENTION

It is one object of this invention to provide a pressure relief device without complex interacting mechanical components that have a relatively high failure rate.

It is another object of this invention to provide a pressure relief device which accommodates a relatively high flowrate of fluid vented from a pressurized vessel.

It is yet another object of this invention to provide a pressure relief device that allows a plug to be blown at least partially, preferably completely, out of a plug housing when operated from a closed condition to an open condition.

The above and other objects of this invention are accomplished with a pressure relief device that operates between a closed condition, wherein fluid is contained within a chamber of a pressurized vessel, and an open condition, wherein the fluid is vented from the pressurized vessel. A plug housing is sealably secured with respect to the vessel. In one preferred embodiment according to this invention, the plug housing has a throughbore which in the open condition of the pressure relief device communicates with the high-pressure chamber of the vessel and an atmosphere outside of the vessel.

A plug is positioned within the throughbore. A passageway, preferably formed between the plug and the plug housing, is at least partially, preferably completely, filled with a fusible alloy. The fusible alloy can be cast or poured into place within the passageway. The passageway preferably follows a helical pathway about the plug or any other suitable pathway between the plug and the plug housing. A helical pathway can increase mechanical retention of the plug within the plug housing by providing a longer pathway and thus increased surface area contact or metallurgical bonding between the fusible alloy and the plug and/or the plug housing. As the fusible alloy softens or melts, the metallurgical bonding and shear strengths associated with the fusible alloy are reduced and thus allow the plug to move with respect to the plug housing. During an upset condition, such as an external fire, the temperature of the fusible alloy increases and thus the fusible alloy softens. Forces resulting from the pressurized fluid acting upon the plug and the fusible alloy blow the plug out of the plug housing and thereby expose a relatively large unrestricted opening that accommodates a relatively high flowrate of vented fluid.

Because of the relatively simple mechanical components of a pressure relief device according to this invention, it is possible to operate a pressure relief device of this invention over a relatively long useful life. For example, a pressure relief device according to this invention can extend beyond a useful life of 20 years and may be exposed to 15,000 or more pressure cycles. Pressure vessels that contain natural gas which is used to fuel a combustion chamber, for example, are often filled to a pressure of about 5000 psi or more, and normally operate at a temperature range from about −40° F. to about 135° F., but may be exposed to temperatures from as low as approximately −100° F. to as high as approximately 180° F.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
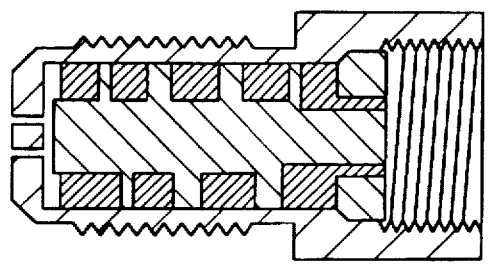
FIG. 1 is a cross-sectional side view, taken along a longitudinal axis, of a conventional pressure relief device.

Conventional pressure relief devices that employ a fusible alloy allow relatively low fluid relief flowrates to pass through passageways normally containing the fusible alloy. FIG. 1 shows one conventional design wherein the left-hand side of the pressure relief device is exposed to a relatively low-pressure atmosphere and the right-hand side is exposed to a relatively high-pressure fluid, such as a fluid contained within a pressurized vessel. The conventional pressure relief device shown in FIG. 1 can be used with a pressurized vessel containing compressed natural gas. When exposed to relatively high temperature and pressure conditions, such as during an external fire condition, the fusible alloy softens or melts and begins to flow through a helical passageway within the plug. As shown in FIG. 1, the softened fusible alloy flows from the high-pressure side to the low-pressure side and eventually oozes through the relatively small cross-sectional area discharge ports and into the relatively low-pressure atmosphere.

According to the conventional design shown in FIG. 1 and with other conventional designs, the housing of the pressure relief device retains the plug within the plug housing and thus does not allow the plug to discharge with respect to the plug housing. During an upset condition, the plug remains a significant flow restriction element. According to pressure relief device 10 of this invention, for example as shown in one preferred embodiment of FIG. 2, plug housing 15 is designed to allow at least a portion and preferably the entire plug 30 to discharge from plug housing 15, for example when pressure relief device 10 is exposed to relatively high pressure and temperature conditions.

Pressure relief device 10 of this invention operates in a normally closed condition which prevents fluid within a pressurized vessel from flowing through pressure relief device 10. When exposed to the relatively high pressure and temperature conditions, pressure relief device 10 according to this invention can be designed to operate in an open condition wherein the fluid is vented from the pressurized vessel, passes through a relatively large unrestricted throughbore and is then discharged to the atmosphere surrounding or outside with respect to the pressurized vessel.

Pressure relief device 10 according to this invention can be used as a relief valve for a vessel which is pressurized with a gaseous or liquid fuel, such as compressed natural gas which can be used for many different combustion applications. FIGS. 2–12 show various preferred embodiments of pressure relief device 10, according to this invention. Pressure relief device 10 comprises plug housing 15 preferably but not necessarily as shown in FIGS. 2–12. As shown in FIGS. 2–12, plug housing 15 has externally threaded end portion 18 and internally threaded socket 19. It is apparent that the externally threaded and internally threaded roles can be reversed and that plug housing 15 can have any suitable shape that adapts to the particular use of pressure relief device 10 according to this invention.

Securement means are used to sealably secure plug housing 15 with respect to the pressurized vessel. In one preferred embodiment according to this invention, the securement means comprise internally threaded socket 19 which can be threadedly engaged with an externally threaded fitting of the pressurized vessel. It is apparent that such securement means may also comprise socket 19 attached with a welded connection or any other suitable fitting sealably secured with respect to plug housing 15. It is one desired result to form a hermetically sealed connection which allows fluidic communication between pressure relief device 10 and the pressurized vessel.

In one preferred embodiment according to this invention, throughbore 17 of plug housing 15 forms communication between the pressurized fluid within a chamber of the vessel and the atmosphere which is outside with respect to such chamber. A longitudinal segment of throughbore 17 which corresponds with plug 30 preferably has a generally circular cross-section. In such preferred embodiment, plug 30 has a generally cylindrical outer peripheral surface 31. Throughout this specification and in the claims, referring to internal surface 16 of plug housing 15 and outer peripheral surface 31 of plug 30 as having generally cylindrical surfaces, relates to viewing such surfaces without housing groove 21 and plug groove 34, respectively.

According to pressure relief device 10 of this invention, fusible alloy 45 is primarily used at normal operating temperatures and pressures to provide resistive shear strength and metallurgical bonding which are sufficient to retain plug 30 within throughbore 17. Fusible alloy 45 preferably forms a metallurgical bond with and between plug 30 and/or plug housing 15. Upon an extreme temperature increase fusible alloy 45 becomes so fluidic that the metallurgical bonding and shear strength are eliminated or reduced enough to allow plug 30 to quickly blow out of throughbore 17. Fusible alloy 45 is preferably sandwiched between plug housing 15 and plug 30 in any physical arrangement that is sufficient to retain plug 30 in its mounted position within throughbore 17 while allowing plug 30 to blow out of throughbore 17 when fusible alloy 45 softens or melts.

In one preferred embodiment according to this invention, fusible alloy 45 is cast or poured within an annular void between internal surface 16 of plug housing 15 and outer peripheral surface 31 of plug 30. Fusible alloy 45 fills at least a portion of a longitudinal length of such annular void. It is possible but not necessary for such annular void to extend the entire length of plug 30 and/or plug housing 15. It is also possible but not necessary for such annular void to form a passageway between the high-pressure chamber and the outside atmosphere.

As clearly shown in FIGS. 2–4, 6, 8, 10 and 12, plug 30 is positioned or mounted within throughbore 17 of plug housing 15. In one preferred embodiment according to this invention, passageway 40 extends and in the open condition of pressure relief device 10 preferably but not necessarily forms communication between the relatively high-pressure chamber and the relatively low-pressure outside atmosphere. In the closed condition of pressure relief device 10, fusible alloy 45 fills an entire cross section of at least a partial length of passageway 40. Fusible alloy 45 preferably fills nearly an entire length of passageway 40.

Passageway 40 can be formed within plug housing 15 and/or plug 30. The cross section and positioning of fusible alloy 45 within passageway 40 can be designed to allow plug 30 to discharge with respect to plug housing 15 and thereby vent pressurized fluid from the vessel. Pressure relief device 10 according to this invention is particularly suitable for relief conditions which require a relatively high fluid relief flowrate. As plug 30 blows out of plug housing 15, the entire unrestricted throughbore 17 is available for passing pressurized fluid from the vessel to the outside atmosphere. Thus according to pressure relief device 10 of this invention, the fluid relief flowrate is not restricted as a function of the cross-sectional area of passageway 40, for example.

Figure 2:
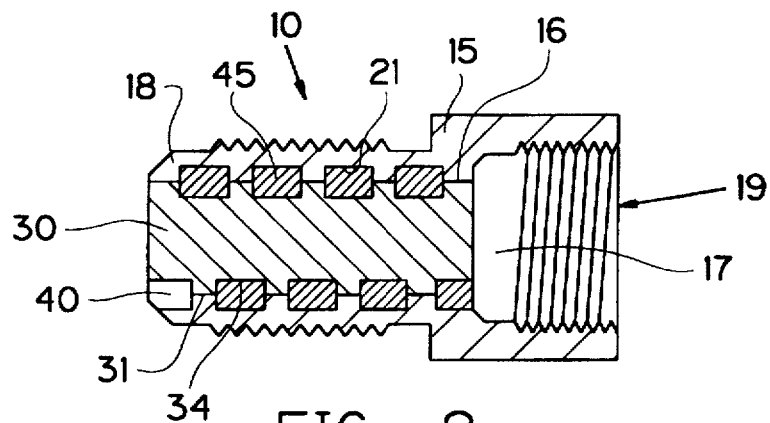
FIG. 2 is a cross-sectional side view, taken along a longitudinal axis, of a pressure relief device according to one preferred embodiment of this invention.
Figure 3:
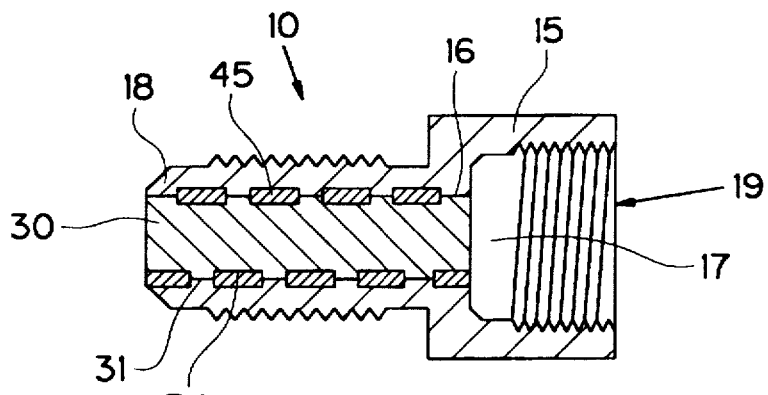
FIG. 3 is a cross-sectional side view, taken along a longitudinal axis, of a pressure relief device according to another preferred embodiment of this invention.
Figure 4:
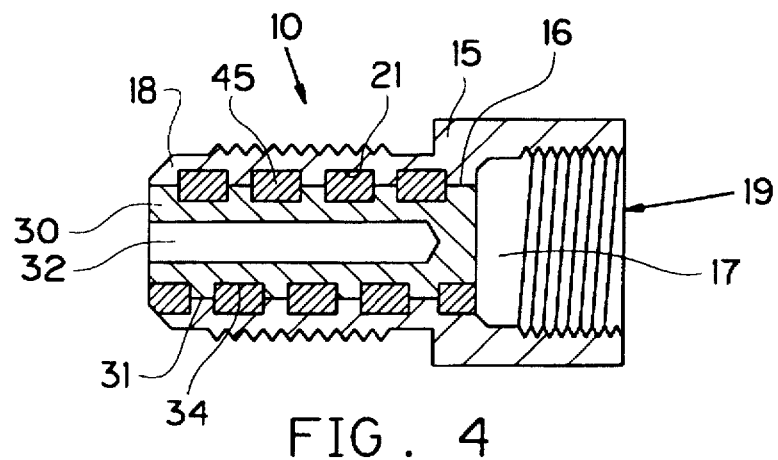
FIG. 4 is a cross-sectional side view, taken along a longitudinal axis, of a pressure relief device according to another preferred embodiment of this invention.

In certain preferred embodiments according to this invention, such as those shown in FIGS. 2–4, passageway 40 is wound along a helical path about plug 30. As shown in FIGS. 2–4, passageway 40 is formed by helical plug groove 34 within outer peripheral surface 31 of plug 30 and corresponding helical housing groove 21 within internal surface 16 which forms throughbore 17.

In other preferred embodiments according to this invention, passageway 40 is formed by only helical plug groove 34 within outer peripheral surface 31 of plug 30. In such preferred embodiments, internal surface 16 of plug housing 15 is generally cylindrical and contains no groove or grooves forming passageway 40. In yet other preferred embodiments according to this invention, passageway 40 is formed only by helical housing groove 21 within internal surface 16 of plug housing 15. In such preferred embodiments, outer peripheral surface 31 of plug 30 is generally cylindrical and contains no groove or grooves forming passageway 40. The preferred embodiments as shown in FIGS. 2–4 and 12, wherein passageway 40 is formed by both plug grooves 34 and housing grooves 21, are particularly suitable for relatively higher operating pressure conditions within the vessel.

The helical or spiral configuration of passageway 40 is particularly advantageous for discharging at least a portion of fusible alloy 45 from passageway 40, such as shortly before plug 30 blows out of throughbore 17. As fusible alloy 45 softens or melts due to a temperature increase, the relatively high fluid pressure within the vessel acts upon fusible alloy 45 which is exposed at the high-pressure end of passageway 40. Such pressure results in a force that pushes at least a portion of fusible alloy 45 through the opening of passageway 40 which is exposed to the outside atmosphere. In many applications, plug 30 will blow out of throughbore 17 before all of fusible alloy 45 is discharged from passageway 40.

In another preferred embodiment according to this invention, passageway 40 is formed by a plurality of longitudinally spaced annular paths or rings about plug 30. Such passageway 40 can be formed by annular plug grooves 34 and/or annular housing grooves 21. In the embodiment shown in FIG. 5, wherein fusible alloy 45 is positioned within passageway 40 comprising one or more annular paths or rings, as fusible alloy 45 melts plug 30 can blow out of throughbore 17 before any fusible alloy 45 discharges from passageway 40. If it is desirable for fusible alloy 45 to discharge from passageway 40, a connecting passageway from the high-pressure end of plug 30 to the low-pressure end of plug 30 preferably can be positioned to intersect the annular plug grooves 34 and/or annular housing grooves 21. For example, a longitudinal groove can intersect at least two annular paths or rings and thereby allow passageway 40 to form communication between the relatively high-pressure fluid within the vessel and the outside atmosphere.

Because of the relatively high flowrate and the relatively short response time required during an upset condition, plug 30 preferably blows completely out of throughbore 17 and away from plug housing 15. However, it is apparent that plug 30 could accommodate the necessary flowrate without blowing completely out of throughbore 17. For example, plug 30 could have a suitably designed cutout portion that would allow the vented fluid to flow through the available cross-sectional area of the cutout portion with plug 30 only partially removed from throughbore 17. Mechanical restraining means, such as plug 30 having a shoulder portion or an enlarged diameter portion that interferes with a mechanical stop secured with respect to plug housing 15, or a mechanical shoulder or other feature of retention housing 50 limiting discharge movement of plug 30 from plug housing 15, can be used to limit longitudinal movement of plug 30 so that at least a portion of plug 30 remains within throughbore 17.

Figure 5:
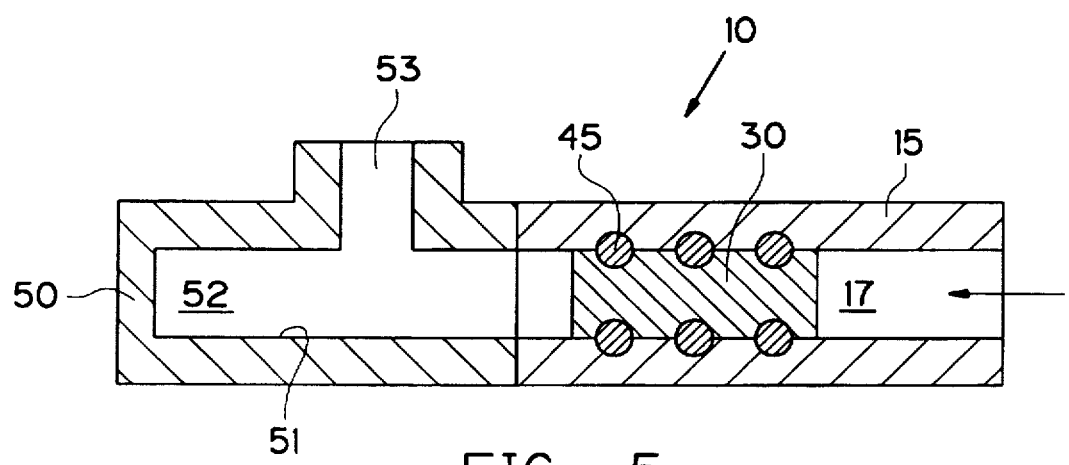
FIG. 5 is diagrammatic cross-sectional side view, taken along a longitudinal axis, of a pressure relief device according to another preferred embodiment of this invention.
Figure 6:
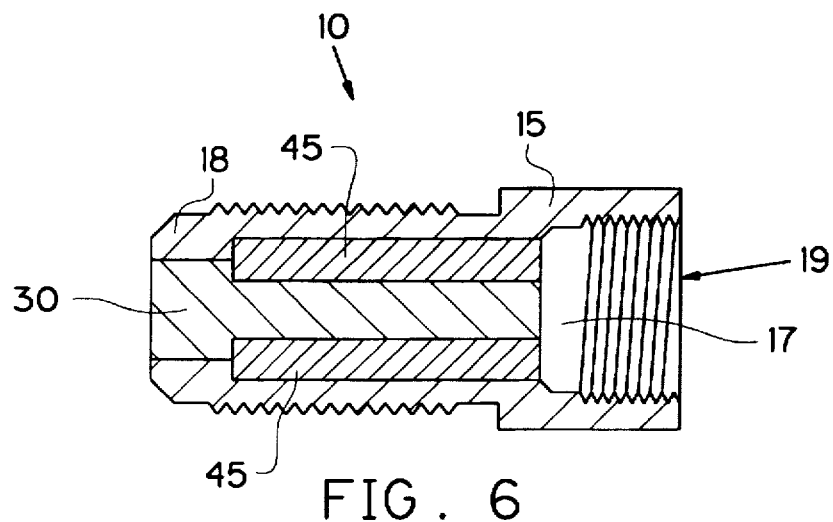
FIG. 6 is a cross-sectional side view, taken along a longitudinal axis, of a pressure relief device according to another preferred embodiment of this invention.
Figure 7:
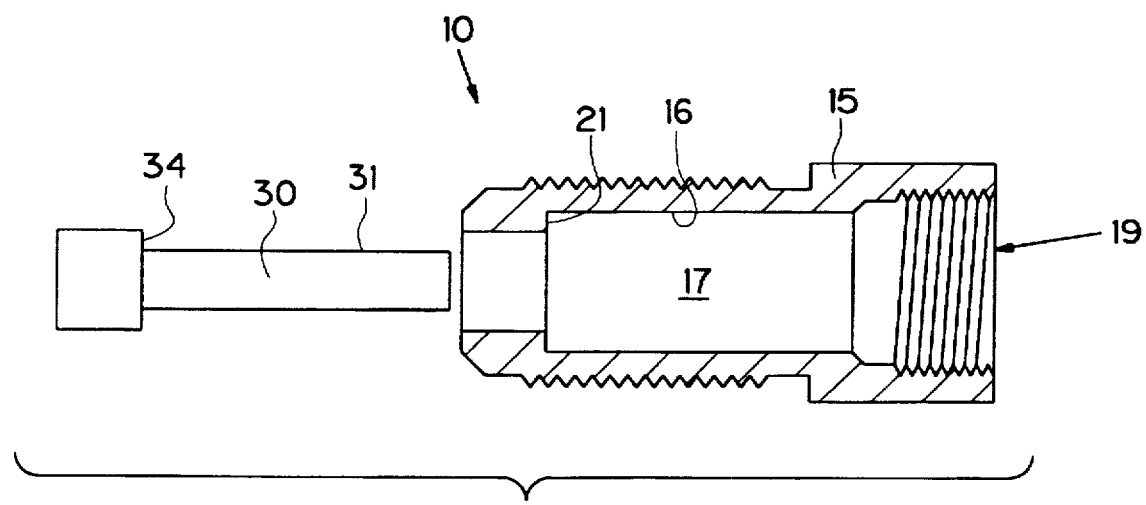
FIG. 7 is an exploded partial cross-sectional view of the pressure relief device shown in FIG. 6.
Figure 8:
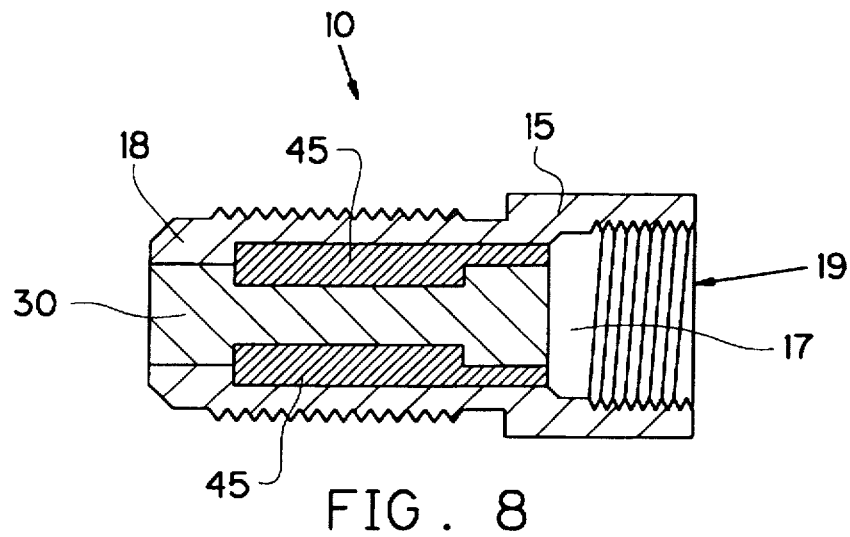
FIG. 8 is a cross-sectional side view, taken along a longitudinal axis, of a pressure relief device according to another preferred embodiment of this invention.
Figure 9:
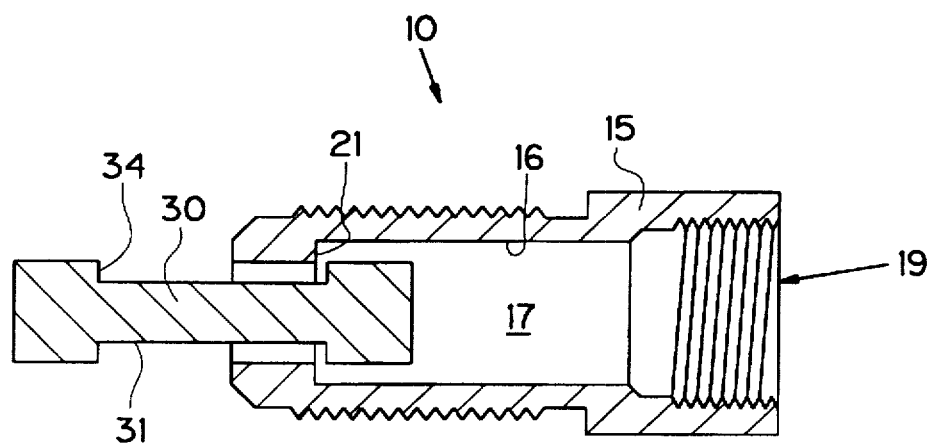
FIG. 9 is a cross-sectional side view of the pressure relief device shown in FIG. 8, with the plug only partially within the plug housing.
Figure 10:
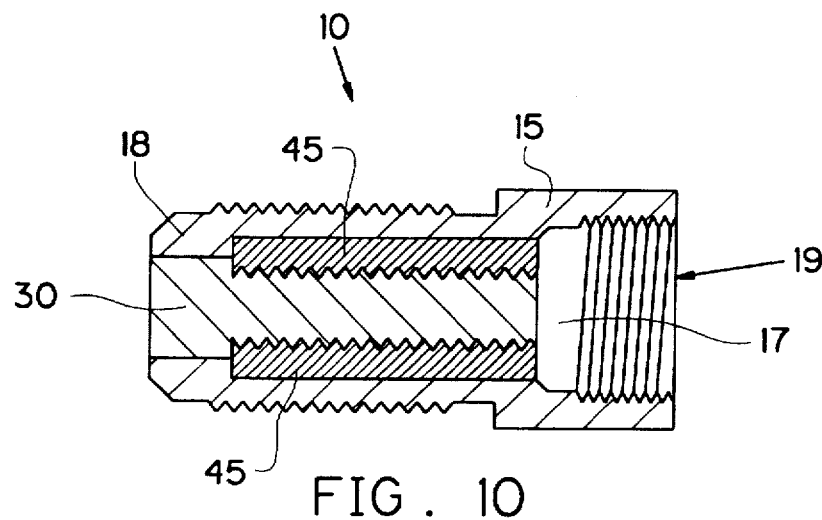
FIG. 10 is a cross-sectional side view, taken along a longitudinal axis, of a pressure relief device according another preferred embodiment of this invention.
Figure 11:
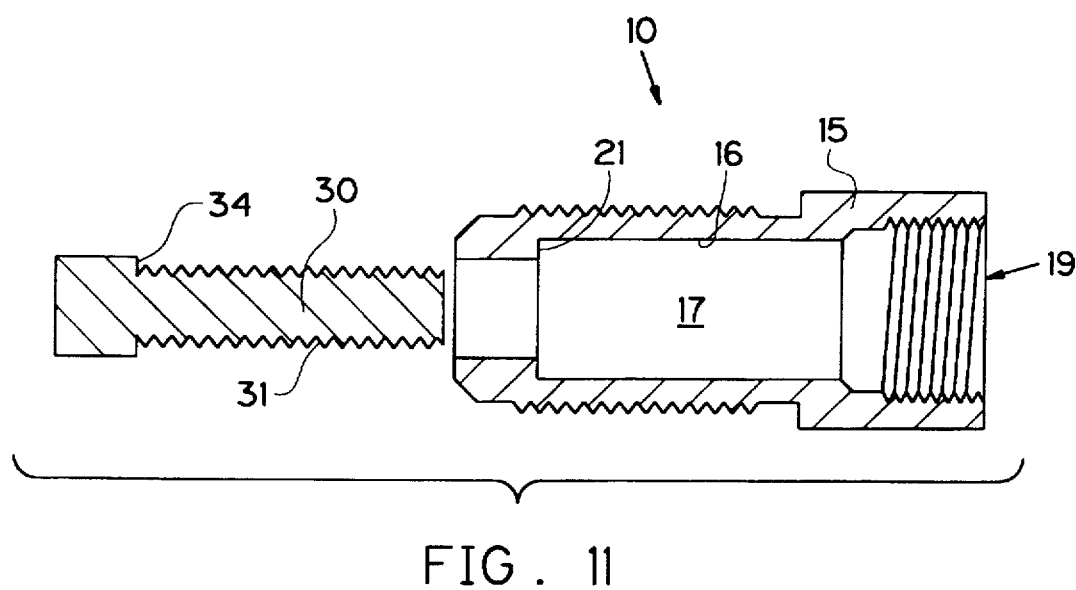
FIG. 11 is an exploded cross-sectional side view, of the pressure relief device shown in FIG. 10.
Figure 12:
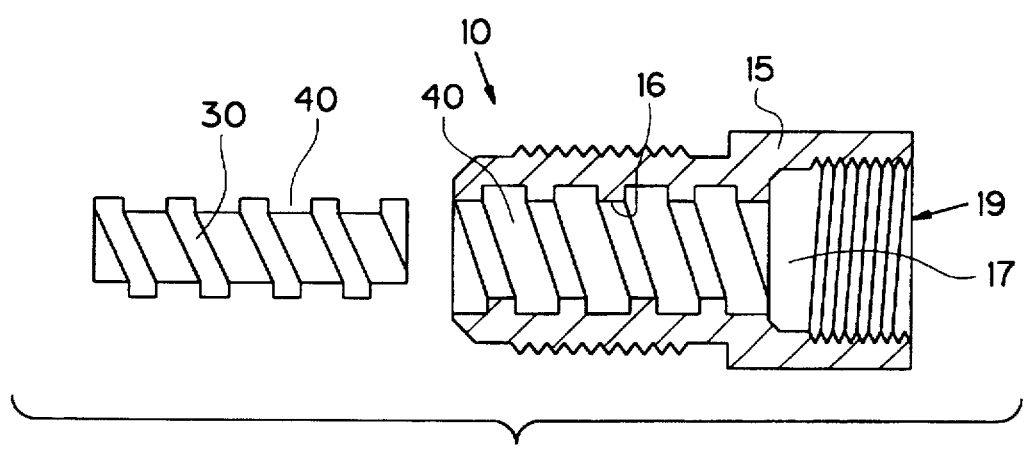
FIG. 12 is an exploded cross-sectional side view, taken along a longitudinal axis, of a pressure relief device according to yet another preferred embodiment of this invention.

In preferred embodiments of pressure relief device 10 wherein plug 30 is completely blown out of throughbore 17, it may be advantageous to retain or capture plug 30 so that it causes no damage as a projectile. According to one preferred embodiment of this invention as shown in FIG. 5, retention means can be used to retain plug 30 when it is discharged from throughbore 17. Such retention means may comprise retention housing 50 secured with respect to plug housing 15 in any suitable manner known to those skilled in the art. Retention housing 50 preferably forms retention chamber 52 which is at least partially defined by internal surface 51. Retention housing 50 also preferably has discharge port 53 or another suitable opening that communicates with the outside atmosphere. Discharge port 53 can be positioned as a side port as shown in FIG. 5 or as one or more ports positioned at other suitable locations of retention housing 50. Discharge port 53 or any other suitable discharge opening is preferably designed and positioned so that it does not bottleneck fluid flow passing through plug housing 15.

In one preferred embodiment according to this invention, retention housing 50 is designed to provide a shock absorbing effect that decelerates a discharged plug 30. In one preferred embodiment according to this invention, such shock absorbing effect is accomplished with internal surface 51 forming a tight fit with outer peripheral surface 31 of plug 30. The air cushion formed within retention chamber 52 when plug 30 is projected within retention housing 50 also reduces rebound forces which could otherwise allow plug 30 to bounce back and possibly damage plug housing 15 and/or block throughbore 17.

As shown in FIG. 4, plug 30 may comprise core 32 which is hollow or filled with a material that has a different heat conductivity factor than the remaining material of plug 30. Core 32 can reduce the thermal capacitance of plug 30 and thereby increase the rate of temperature rise of plug 30 and/or fusible alloy 45. Thus, core 32 can be designed to decrease the response time that it would take for plug 30 to blow out of plug housing 15.

Plug housing 15, plug 30 and other related elements of pressure relief device 10, according to this invention, can be constructed of any suitable metal, ceramic material, or other material known to those skilled in the art of pressure relief devices. In certain preferred embodiments according to this invention, fusible alloy 45 may comprise any one or a chemical composition of fusible alloys or other eutectic materials known to those skilled in the art, such as bismuth, lead, tin and cadmium. Fusible alloy 45 may have a melting temperature in the range of approximately 100° C. to approximately 150° C.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

We claim:

1. A pressure relief device operating between a closed condition wherein a fluid is contained in a chamber of a vessel and an open condition wherein the fluid is vented from the vessel, the pressure relief device comprising:

a plug housing, securement means for sealably securing said plug housing with respect to the vessel, said plug housing having a throughbore, in the open condition said throughbore in communication with the chamber and an atmosphere outside of the vessel;

a plug, said plug mounted within said throughbore, at least one of said plug and said plug housing forming a void between said plug and said plug housing, said void formed by an annular space between said plug and said plug housing, said annular space extending for less than an entire longitudinal length of said plug, a fusible alloy, said void at least partially filled with said fusible alloy; and release means for allowing said plug to be at least partially discharged from said plug housing upon a release temperature of said fusible alloy and a release pressure of the fluid within the chamber.

2. A pressure relief device according to claim 1 wherein said securement means comprise said plug housing having an internally threaded socket.

3. A pressure relief device according to claim 1 wherein said throughbore has a generally circular cross section.

4. A pressure relief device according to claim 1 wherein said void is formed by a passageway between and in communication with the chamber and the atmosphere.

5. A pressure relief device according to claim 4 wherein said fusible alloy fills nearly an entire length of said passageway.

6. A pressure relief device according to claim 1 wherein said plug forms a sealed fit with respect to said plug housing and blocks communication between the chamber and the atmosphere when said plug is mounted within said throughbore.

7. A pressure relief device according to claim 1 wherein said release means comprise said throughbore having an open end exposed to a low pressure side of said throughbore, and said open end having an opening large enough to allow said plug to at least partially pass in a longitudinal direction through said opening.

8. A pressure relief device according to claim 1 wherein said release means comprise a maximum external radius of said plug taken normal to a longitudinal axis of said plug being less than a minimum internal radius of a longitudinal segment of said throughbore corresponding to said plug taken normal to said longitudinal axis.

9. A pressure relief device according to claim 1 wherein said release means allow said plug to be completely discharged from said plug housing.

10. A pressure relief device according to claim 1 further comprising retention means for retaining said plug when discharged from said throughbore.

* * * * *